(12) United States Patent
Eliaz et al.

(10) Patent No.: US 10,361,808 B2
(45) Date of Patent: Jul. 23, 2019

(54) SYSTEM, DEVICE, AND METHOD FOR MULTI-MODE COMMUNICATIONS

(71) Applicant: AVAGO TECHNOLOGIES INTERNATIONAL SALES PTE. LIMITED

(72) Inventors: Amir Eliaz, Moshav Ben Shemen (IL); Ilan Reuven, Ganey Tikva (IL); Daniel Stopler, Holon (IL); Roy Oren, Magshimim (IL); Shimon Benjo, Petach Tikva (IL)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 22 days.

(21) Appl. No.: 15/340,571

(22) Filed: Nov. 1, 2016

(65) Prior Publication Data
US 2017/0141875 A1 May 18, 2017

Related U.S. Application Data

(60) Provisional application No. 62/266,345, filed on Dec. 11, 2015, provisional application No. 62/254,732, filed on Nov. 13, 2015.

(51) Int. Cl.
| | |
|---|---|
| *H04L 1/00* | (2006.01) |
| *H04W 72/08* | (2009.01) |
| *H04W 72/04* | (2009.01) |
| *H04W 8/22* | (2009.01) |

(52) U.S. Cl.
CPC ............ *H04L 1/0006* (2013.01); *H04W 8/22* (2013.01)

(58) Field of Classification Search
CPC . H04W 88/085; H04W 92/14; H04W 52/228; H04W 52/367; H04W 8/22
See application file for complete search history.

(56) References Cited

U.S. PATENT DOCUMENTS

| | | | | |
|---|---|---|---|---|
| 9,866,356 B2* | 1/2018 | Hua | ................... | H04L 67/2823 |
| 2009/0003458 A1* | 1/2009 | Au | ..................... | H04N 21/2343 |
| | | | | 375/240.25 |
| 2014/0141728 A1* | 5/2014 | Devarasetty | ........... | H04B 17/18 |
| | | | | 455/67.14 |
| 2014/0198872 A1* | 7/2014 | Barriac | ................ | H04W 24/08 |
| | | | | 375/285 |
| 2016/0029027 A1* | 1/2016 | Katamaneni | ......... | H04N 19/134 |
| | | | | 375/240.02 |
| 2016/0036715 A1* | 2/2016 | Akazawa | ............... | H04L 69/04 |
| | | | | 370/392 |

* cited by examiner

Primary Examiner — Romani Ohri
(74) Attorney, Agent, or Firm — Xsensus LLP (57) ABSTRACT

A device includes circuitry configured to determine one or more signal processing capabilities of another device in communication with the device. The device configures a signal compression mode of the device to correspond to a first signal compression mode of a plurality signal compression modes based on the one or more signal processing capabilities of the other device. The device s configured to modify, in response to detecting variations in one or more network configuration properties or the one or more signal processing capabilities of the other device, the signal compression mode of the device.

18 Claims, 5 Drawing Sheets

SYSTEM, DEVICE, AND METHOD FOR MULTI-MODE COMMUNICATIONS

CROSS-REFERENCE TO RELATED PATENT APPLICATIONS

The present application claims the benefit of the earlier filing date of U.S. provisional application 62/254,732 having common inventorship with the present application and filed in the U.S. Patent and Trademark Office on Nov. 13, 2015, the entire contents of which being incorporated herein by reference. The present application also claims the benefit of the earlier filing date of U.S. provisional application 62/266,345 having common inventorship with the present application and filed in the U.S. Patent and Trademark Office on Dec. 11, 2015, the entire contents of which being incorporated herein by reference.

TECHNICAL FIELD

The present disclosure is directed to wireless communications, specifically mitigating the effects of distortion at transmitters and receivers.

BACKGROUND

Conventional communication methods and systems suffer severe performance degradation in the presence of nonlinear distortion. The nonlinear distortion that may be originated by analog and RF components may cause sensitivity loss at the receiver as well as spectral regrowth that may exceed spectral mask limitations and interfere with adjacent channels. Further limitations and disadvantages of conventional and traditional approaches will become apparent to one of skill in the art, through comparison of such systems with some aspects of the present invention as set forth in the remainder of the present application with reference to the drawings.

INCORPORATION BY REFERENCE

The entirety of each of the following documents is hereby incorporated herein by reference:

U.S. patent application Ser. No. 14/809,408 titled "Orthogonal Frequency Division Multiplexing Based Communications Over Nonlinear Channels" filed on Jul. 27, 2015;

U.S. patent application Ser. No. 14/522,826 titled "Reception of Inter-Symbol Correlated Signals Using Symbol-by-Symbol Soft-Output Demodulator" filed on Oct. 24, 2014;

U.S. patent application Ser. No. 14/600,310 titled "Communication Methods and Systems for Nonlinear Multi-User Environments" filed on Jan. 20, 2015;

U.S. patent application Ser. No. 14/659,797 titled "Acquisition of Nonlinearity m Electronic Communication Devices" filed on Mar. 17, 2015; and U.S. patent application Ser. No. 14/704,260 titled "Signal Acquisition in a Multimode Environment" filed on May 5, 2015.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

In an exemplary implementation, a device includes circuitry configured to determine one or more signal processing capabilities of another device in communication with the device. The device configures a signal compression mode of the device to correspond to a first signal compression mode of a plurality signal compression modes based on the one or more signal processing capabilities of the other device. The device is configured to modify, in response to detecting variations in one or more network configuration properties or the one or more signal processing capabilities of the other device, the signal compression mode of the device.

In another exemplary implementation, a process includes determining via circuitry of a first device, one or more signal processing capabilities of a second device in communication with the first device indicating an amount of nonlinear distortion present in signals received from the second device; configuring, at the first device, a signal compression mode corresponding to a first signal compression mode of a plurality of signal compression modes based on the one or more signal processing capabilities of the second device; and modifying, in response to detecting variations in one or more network configuration properties or the one or more signal processing capabilities of the second device, the signal compression mode of the first device.

In another exemplary implementation, a system includes at least one device including a transceiver with circuitry configured to determine one or more signal processing capabilities of another device in communication with the at least one device via a wireless communication network indicating an amount of nonlinear distortion present in signals received from the another device, configure a signal compression mode the transceiver to correspond to a first signal compression mode to process one or more signals received from the another device having the nonlinear distortion, and modify, in response to detecting a reduction in an amount of non-linear distortion, the signal compression mode of the device at least one device to correspond to a second signal compression mode.

Orthogonal frequency-division multiplexing (OFDM) and corresponding multi-user version OFDMA (Orthogonal Frequency-Division Multiple Access) are prevalent modulation techniques in many recent electronic communication standards and applications. A drawback of OFDM/OFDMA communication is a high PAPR. (Peak-to-Average Power Ratio) of the modulated signal. The high PAPR may dictate that a power amplifier (PA) operates at a high power backoff, which results in reduced efficiency. Alternatively, operating the PA with less power backoff compresses the signal (due to PA saturation), which results in nonlinear distortion when an instantaneous signal level enters a nonlinear region of the PA response. Accordingly, one or more distortion mitigation techniques may be applied to a signal before or during transmission of the signal. Such distortion mitigation techniques may include, for example, PAPR reduction techniques and Digital Pre-Distortion (DPD).

Another way to mitigate the effects of nonlinear distortion in addition to the PAPR reduction techniques and DPD, particularly in commercial systems in which an applicable standard did not adopt distortion mitigation techniques (e.g., PAPR reduction) in a transmitter, is to counteract or mitigate the impact of the nonlinearity by performing signal processing algorithms that are applied at the receiver. Such receiver-side mitigation techniques can improve signal reception both in cases where the transmitter is configured to perform distortion mitigation techniques and in cases where the transmitter is not configured to perform distortion mitigation techniques. In an exemplary implementation of the present disclosure, receiver circuitry makes use of distortion mitigation techniques based on a generated model of the nonlinearity of the transmitter.

The model of transmitter nonlinearity may be configurable via one or more parameter values which may be adapted using an existing training signal set forth in an applicable standard and/or by exchanging management messages with the transmitter. In some cases the transmitter nonlinearity may be known (in part or totally) a priori to the receiver. This may be the case, for example, when DPD is used at the transmitter and the DPD results in a convergence of the response of the transmitter to a predetermined response (such as an ideal clip response). By using this model of the nonlinearity of the transmitter as well as the received noisy and distorted signal, the receiver estimates the transmitted signal that best fits the model and the received signal. This reception approach can be applied to compressed transmissions by existing standards-compliant devices as it does not necessarily require changes or additions to the standards (unlike for example, some transmit-side PAPR reduction methods which may need to be precisely defined in the specified model of the transmitted signal). Through software and firmware changes only, existing standards compliant communication devices can be configured to support both standards compliant and highly compressed (e.g., non-standards compliant) transmission modes, and to switch between the transmissions modes during operation. A distortion mitigating receiver in accordance with an exemplary implementation of the present disclosure may employ a "turbo-like" iterative detection scheme that includes a soft-input-soft-output channel decoder and a nonlinear equalizer that uses the model of transmitter nonlinearity. Examples of such a receiver are described in, for example, the documents incorporated by reference above.

Throughout the disclosure, references are made to transmitters and receivers operating in one or more compression modes and switching back and forth between the compression modes. For example, a transmitter can compress a transmitted data stream so that a resulting error vector magnitude (EVM) is greater than an EVM threshold set forth by a particular wireless communication standard, which is referred to as a high-EVM compression mode. In order to receive the data stream transmitted in the high-EVM compression mode, a receiver may also operate in a high-EVM compression mode in which the receiver implements the distortion mitigation techniques. The transmitter and receiver can also operate in a low-EVM mode in which the EVM of the transmitted data stream is less than or equal to the EVM threshold set forth in an applicable wireless communication network standard, and the receiver is able to recover the transmitted data stream without implementing distortion mitigation techniques. The distortion mitigation techniques can be interchangeably referred to as nonlinearity mitigation techniques. In addition, references to data streams throughout the disclosure can be interchangeably be referred to as signals.

Aspects of the present disclosure are directed to allow co-existence between dual compression mode transmitters and receivers configured to operate in both the high-EVM compression mode and the low-EVM compression mode and single compression mode receivers configured to operate in only the low-EVM compression mode. Having the ability to transmit and recover signals in the high-EVM compression mode provides advantages such as increased transmit power, which translates to an increased link distance and data rate. However, not all devices are configured to operate in the high-EVM mode, and operating in the high-EVM compression mode may not be beneficial under some network conditions. The present disclosure provides a single-chip implementation of a transceiver for an access point and/or client device that provides for seamlessly and adaptively transitioning back and forth between the high-EVM compression mode and the low-EVM compression at both the transmitter and the receiver. In addition, the devices configured with the dual compression mode transceiver are able to switch back and forth between the high-EVM compression mode or the low-EVM compression mode independently of a compression mode of other devices in a wireless communication network.

Figure 1:
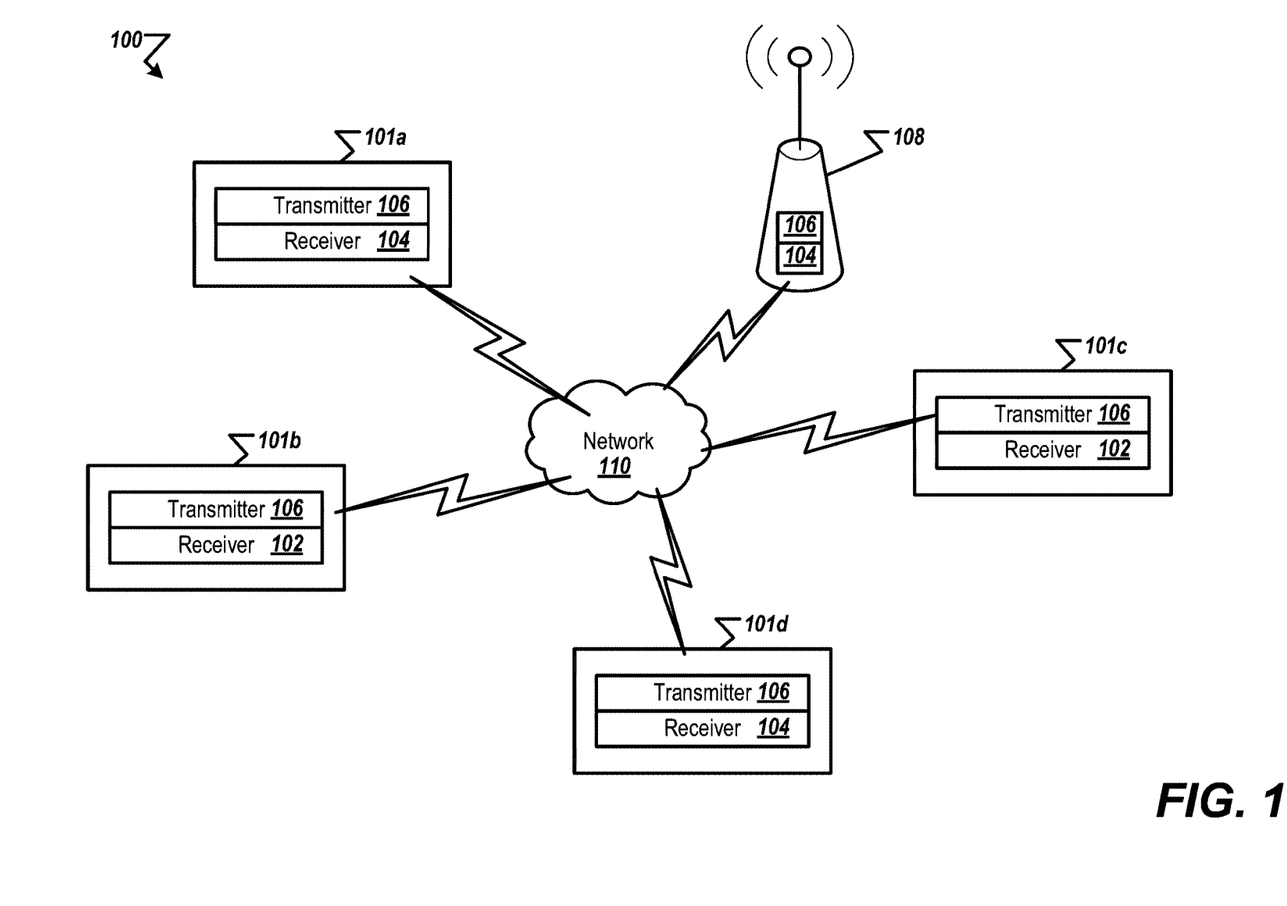
FIG. 1 is an exemplary diagram of a wireless communication system.

Now referring to FIG. 1, an example wireless communication system 100 includes multiple devices 101, which, for purposes of illustration, are assumed to operate in an infrastructure setup, but aspects of this disclosure are also applicable to ad-hoc or peer-to-peer setups. In some implementations, the devices 101 are devices that are connected to an access point (AP) 108 via network 110, which can by any type of wireless network, such as an IEEE 802.11ac network, other IEEE 802.11 standard networks, or any other type of wireless communication network. The devices 101 can also be connected to one another through the network 110.

The system 100 includes multiple devices 101 in communication with the AP 108, some of which include single compression mode transmitters/receivers and some of which include dual compression mode transmitters/receivers. For example, the devices 101b and 101c include a transmitter 106 and a receiver 102, which are configured to operate in the low-EVM compression mode as single compression mode devices. The devices 101a and 101d as well as the AP 108 include dual compression mode transmitters 106 and receivers 104 which are configured to use nonlinearity-mitigating techniques such as those described in the documents incorporated by reference above and are able to operate in both the high-EVM compression mode and the low-EVM compression mode. In some implementations, the transmitter 106 and/or receiver 104 of the AP 108 as well as the devices 101a and 101d can be configured to independently determine whether to implement the high-EVM compression mode of the low-EVM compression mode based on the compression mode capabilities of the other devices of the system 100, environmental factors, network configuration properties, link demands on the system 100, etc.

Performance of the single compression mode receivers 102 in the devices 101b and 101c which are not configured to perform nonlinearity mitigation techniques can be limited by an EVM of the transmitted signal, limits for which can be specified specific by an applicable standard. For a receiver 102, severe degradation (e.g., as measured by BER—Bit Error Rate, BLER—Block Error Rate, PER—Packet Error Rate, and/or the like) can occur for EVM levels that are equal to or greater than a value corresponding to a power of additive white Gaussian noise (AWGN) at a sensitivity signal-to-noise ratio (SNR) threshold, normalized to the signal power (i.e., $1/SNR^{th}$). For a dual compression mode receiver 104 that is configured to perform in nonlinearity mitigation techniques, the degradation is lower than for the receiver 102.

In some implementations, the dual compression mode transmitter 106 and receiver 104 of the AP 108 and the devices 101a and 101d can be implemented as a single-chip transceiver. Some of the transmitters 106 and/or receivers 104 in the devices 101 are configured to transmit and/or receive data streams in the high-EVM compression mode or the low-EVM compression mode (e.g., devices 101a,d and AP 108), and other transmitters 106 and/or receivers 102 may be configured to transmit data streams only in the low-EVM compression mode (e.g., devices 101b,c). In some implementations, the receivers 102 cannot successfully demodulate and decode (e.g., as measured by BER, BLER, PER, and/or the like) the information carried in a highly compressed signal (or high-EVM signal as referred to herein) whereas the receivers 104 are capable of successfully demodulating and decoding the information carried in such a signal and can operate in both the high-EVM compression mode and the low-EVM compression mode. For example, the devices 101 can be devices which are sensitive to power consumption, such as battery-operated smartphones, handsets and laptops, and may operate in the high-EVM compression mode to save power consumption and battery power.

In some implementations, the AP 108 uses a high-EVM receive mode for receiving data streams from the dual compression mode devices 101a and 101d and may coordinate communications of the power-sensitive devices so that no more than a maximum number of concurrently-supported high-EVM streams are received at any given time. The PA of the devices 101a and 101d may be operated by a configurable, power efficient power supply (e.g., buck-boost converter, switched power supply, Average Power Tracking (APT) device) that allows for a reduction in the average DC power consumed by the PA to a desired low level that supports a predetermined transmit power for a reliable communication link (considering the user required throughput, capacity, channel conditions, network conditions, etc.) with the high-EVM compression mode. The high-EVM compression mode provides higher transmit power and power efficiency than the standard low-EVM mode at a desired low DC supply voltage, which allows the devices 101a and 101d to maintain a communication uplink from the devices 101a and 101d to the AP 108.

In an example implementation, a transmitter 106 may support T (an integer) transmission types, each of which corresponds to a respective one of T levels of compression (e.g., for T=2 the two types may be high-EVM (or "non-standards-compliant EVM) and low-EVM (or "standards-compliant EVM") and the type in-use may be conveyed with a single bit). In an example implementation, for a transmitter 106 operating in the low-EVM compression mode, the EVM of the transmitted signal may be kept below an EVM threshold set by an applicable standard for the MCS in use (e.g., some standards set this to around 6 dB to 10 dB better than a minimum SNR to demodulate the MCS in use). In an example implementation, for a transmitter 106 operating in the high-EVM compression mode, the EVM of the transmitted signal may be substantially greater (e.g., 10 dB to 20 dB greater) than the EVM threshold for low-EVM compression mode. The transmission type used by a particular transmitter 106 in either the AP 108 and/or the devices 101 can be adaptively determined at the AP 108 and/or the devices 101 per packet, per burst of packets, and/or per connection in order to match the capabilities and available resources of the individual receivers 104, 106 and/or the network 100 as a whole. Accordingly, information conveying the type of transmission may be sent per transmission, per burst per, per packet, or per connection.

In operation, any particular transmitter 106 (each transmitter 106 may reside in a device 101 or access point 108) may operate in a dual compression mode where when in a first (high-EVM) compression mode, transmissions by the transmitter 106 are compressed, resulting in an EVM above a predetermined EVM threshold, such as a threshold set forth in an applicable standard. When operating in the low-EVM compression mode, the EVM of the transmissions by the transmitter 106 of the AP and/or devices 101 are less than the predetermined EVM threshold.

In order to successfully (e.g., with an error rate below a determined threshold) demodulate and decode the transmission in the high-EVM compression mode, the receiver 104 of the AP 108 and/or device 101a,d may apply distortion mitigation techniques to the received signal. In a second (low-EVM) compression mode, transmissions by the transmitter 106 are substantially linear (e.g., having EVM below a determined threshold, such as a threshold set forth in an applicable standard). When signals are transmitted in the low-EVM compression mode, the receiver 104 of the AP 108 and/or device 101a,d may not need to apply the distortion mitigation techniques to successfully demodulate and decode the transmissions.

In some implementations, the AP 108 and/or the devices 101a,d can communicate compression mode capabilities and other related parameters to one another communicate via the network 110, which includes a signal compression mode communications protocol. For example, the signal compression mode communications protocol can include a high-EVM compression mode capability message where the AP 108 and/or device 101a,d can communicate control information indicating whether the device 101a,d and/or AP 108 includes a transmitter 106 and/or receiver 104 configured to operate in the high-EVM compression mode and the low-EVM compression mode. In addition, the signal compression mode communications protocol can also include a high-EVM compression mode parameters message that includes parameters related to the operation of the high-EVM compression mode at the transmitter 106 and/or receiver 104 of the AP 108 (or device 101). Details regarding the high-EVM compression mode capability message and high-EVM compression mode parameter message are discussed further herein.

Figure 2:
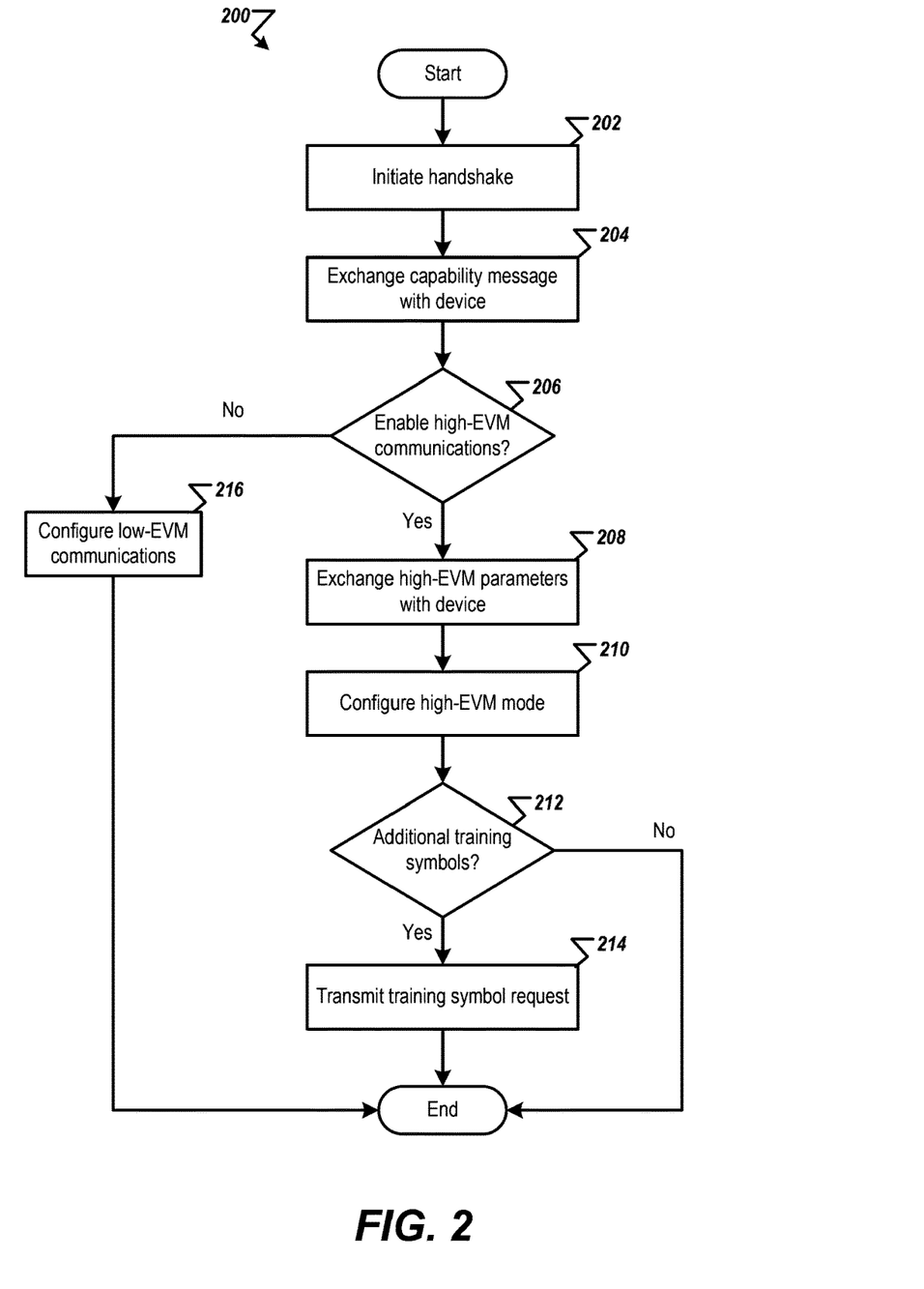
FIG. 2 is an exemplary flowchart of a multi-mode communication process.

FIG. 2 is an exemplary flowchart of a multi-mode communication process 200. The multi-mode communication process 200 is described herein with respect to the AP 108 that includes the dual compression mode transmitter 106 and receiver 104, which can also be applied to the device 101a,d that also includes the dual compression mode transmitter 106 and receiver 104. Stated another way, the AP 108 and the dual-compression mode devices 101 can be referred to interchangeably throughout the description of the multi-mode communication process 200. For example, the steps of the process performed by the AP 108 can also be performed by the dual compression mode device 101, and vice versa. The process 200 can also be applied to two or more dual compression mode devices 101 in communication with one another. In addition, the multi-mode communication process 200 can be applied to other types of transmitters and receivers that can be configured to operate in two or more compression modes.

At step 202, the AP 108 and at least one device 101 initiate a handshake procedure when the at least one device 101 is admitted to the network 110. In one example, the handshake procedure occurs upon startup of the device 101 such as after power up, in response to receiving a user command for network connection from the device 101, or upon automatic network connection when the device 101 detects the AP 108.

At step 204, the AP 108 receives a high-EVM compression mode capability message from the device 101 that includes control information indicating whether the device 101 includes a transmitter 106 and receiver 104 configured to operate in the high-EVM compression mode and the low-EVM compression mode. Likewise, the AP 108 transmits a high-EVM compression mode capability message to the device 101 that includes control information indicating whether the AP 108 includes a dual compression mode transmitter 106 and receiver 104. In some implementations, the control information is sent to the AP 108 and/or device 101 in IEEE 802.11 information elements (IEs) with a vendor-specific ID and an assigned Organizational Unique Identifier (OUI). For example, in IEEE 802.11 standards, the control information can be conveyed by using an IE with element ID=221 in a management message. This IE type facilitates interoperability in the presence of nonstandard information. The capability message may also include parameters such as supported modulation and coding schemes (MCSs) in the high-EVM compression mode, power backoff to be used for each supported MCS, model type and model parameters values of the PA of the terminal device, maximum number of high-EVM streams that can be transmitted or received by the terminal device, maximum number of transmit channels (PA), maximum number of spatial streams, DPD model and parameters, cyclic response of a time domain filter of the transmitter, supported channel BW, and any other parameters that are needed to configure the high-EVM compression mode on both sides. Details regarding the application of the parameters to the transmitter 106 and receiver 104 are discussed further herein.

At step 206, the AP 108 (or device 101) decodes the capability message received from the device 101 (or AP 108) and determines whether to enable high-EVM communications with the device 101 (or AP 108) at the transmitter 106 and/or the receiver 104. The AP 108 (or device) can determine whether to enable high-EVM communications with the device 101 (or AP 108) based on various factors that can include network congestion; amount of interference between the devices 101; number of devices 101 admitted to the network 110; number of clients admitted to the network 110; distance between devices 101 of the network 110; channel multipath; mobility (i.e., whether a device 101 is moving, a direction it is moving, how fast it is moving, etc.); transmit power limitations (e.g., established by a standards body or regulatory body such as the FCC and ETSI); maximum number of devices 101 permitted to be admitted to the network 110 at any given time; which channel(s) have been allocated for a particular transmission or connection; battery power status of the devices 101 (devices 101 that have limited battery life or battery voltage drop below a certain predefined value may use the high-EVM compression mode at a relatively low transmission power (e.g., at or below the maximum transmission power supported in the low-EVM compression mode) to reduce power consumption of the PA and to improve power efficiency and battery life), quality of service (QoS) requirements for particular packets, bursts, or connections; latency; application; user priority; "smart" receiver resources (that could be limited and support limited number of terminals/clients), etc., which may vary over time. Details regarding the factors that affect the determination of whether or not to implement the high-EVM compression mode are discussed further herein.

In addition, the AP 108 and device 101 can make determinations of whether or not to implement the high-EVM mode or the low-EVM mode for the transmitter 106 and/or receiver 104 independently of one another and/or multiple transmitters 106 and/or receivers 104 of the AP 108 and/or devices 101 may exchange messages to coordinate a group decision, and/or a network coordinator may make the mode determinations for the transmitters 106 and/or receivers 104. If the AP 108 (or device 101) decides to enable high-EVM communications with a particular device 101 (or AP 108), resulting in a "y" at step 206, then step 208 is performed. Otherwise, if AP 108 (or device 101) decides to enable low-EVM communications with the device (or AP 108), resulting in a "no" at step 206, then step 216 is performed.

At step 208, in response to deciding to enable high-EVM communications with the device 101 (or AP 108), the AP 108 (or device 101) exchanges one or more high-EVM parameters with the device 101 (or AP 108) in a high-EVM compression mode parameter message that can also be sent in an IEEE 80.11 IE. The high-EVM parameter message may include parameters related to the operation of the high-EVM compression mode at the transmitter 106 and/or receiver 104 of the AP 108 (or device 101) such as: supported MCSs in the high-EVM compression mode, power backoff to be used for each supported MCS, maximum number of supported high-EVM streams, maximum number of transmit channels (PA), maximum number of spatial streams and other parameters that related to the AP limitations in the high-EVM compression mode.

At step 210, the AP 108 (or device 101) configures the high-EVM compression mode for communications with the device 101 (or AP 108) at the transmitter 106 and/or receiver 104 based on the parameters exchanged between the AP 108 and the device 101. When operating in the high-EVM compression mode for data streams received from the device 101 (or AP 108), the received streams are processed with the distortion mitigation circuitry of the receiver 104. In some implementations, the receiver 104 may operate concurrently in the high-EVM compression mode and the low-EVM compression mode where a first stream received from the device 101 (or AP 108) is processed with the distortion mitigation circuitry and another stream received from another device is not processed with the distortion mitigation circuitry. In addition, the AP 108 (or device 101) can configure the transmitter 106 to compress the transmission data streams at a compression rate that corresponds to the high-EVM compression mode.

At step 212, the AP 108 (or device 101) determines whether the receiver 104 can use additional training symbols received from the transmitter 106 of the device 101 (or AP 108) to improve performance of the receiver 104. For example, based on communication channel conditions and physical layer configuration, (e.g., MCS, throughput, number of spatial streams, MIMO configuration) additional training symbols (e.g., LTF, EXLTF, headers, preambles, probe signals, NDPs—Non-Data Packets) can improve an accuracy of the receiver's model of the nonlinearity of the transmitter, as well as the channel estimation. If the AP 108 (or device 101) determines that a projected performance of the receiver 104 can be improved through processing additional training symbols by more than a predetermined threshold amount of improvement, resulting in a "yes" at step 212, then step 214 is performed. The predetermined threshold amount of improvement may correspond to an error or noise measurement parameter such as SNR, BER, BLER, PER, RSS—Received Signal Strength, MSE—Mean Square Error, etc. Otherwise, if the AP 108 determines that the performance of the receiver 104 may not be improved through the additional training symbols, resulting in a "no" at step 212, then the process 200 is terminated.

At step 214, the AP 108 (or device 101) executes a request to the device 101 (or AP 108) for additional training symbols. The request may be executed by a dedicated message or by sending a message including capabilities to the receiver 104 of the device 101 (or AP 108) that triggers the extra training symbols from the device 101 (or AP 108). The receiver 104 of the AP 108 (or device 101) may use existing training symbols from old generations of IEEE 802.11 releases (e.g., a,b,g,n) such as L-STF, L-LTF, L-SIG, VHT-SIG-A, VHT-STF, VHT-LTF, VHT-SIG-B to improve (linear) channel estimation and nonlinear (model, parameters) response estimation. In response to receiving a request for additional training symbols, the device 101 (or AP 108) transmits one or more additional training symbols to the AP 108 (or device). Details regarding the application of the additional training symbols are discussed further herein.

At step 216, in response to determining at step 206 to not enable high-EVM communications with the device 101 (or AP 108), the AP 108 (or device 101) configures low-EVM communications with the device 101 (or AP 108). In some implementations, the low-EVM compression mode is enabled when the device 101 includes the single compression mode receiver 102 that does not include the distortion mitigation circuitry. The low-EVM compression mode may also be implemented for other reasons that can include instances where the AP 108 has already enabled the high-EVM compression mode for a maximum number of higher-priority concurrent communications streams as well as other reasons described further herein. When the low-EVM compression mode is implemented, received signals bypass the distortion mitigation circuitry. In addition, the AP 108 (or device 101) can configure the transmitter 106 to compress the transmission data streams at a compression rate that corresponds to the low-EVM compression mode.

The AP 108 and/or device 101 may switch on and off the high-EVM compression mode due to capabilities of the devices in communication with the AP 108 and/or device 101 as well as variations of network conditions including channel response, SNR, device mobility, number of users, user throughput and overall throughput, interferences, battery life of the device 101, user priority, terminal/client location, etc. In some instances, these characteristics and capabilities of the transmitter 106 and receiver 104 of the AP 108 and the device 101 can change per packet and/or per-packet burst. In some instances each connection between a transmitter 106 and/or receiver 104 of the device 101 and a transmitter 106 and/or receiver 104 of the AP 108 may have a set of associated characteristics that do not change per packet or per burst. In some instances, a set of these characteristics may be common to all connections between the transmitters 106 and the receivers 104. The transmitter 106 can determine whether to transmit in a high-EVM compression mode or a low-EVM compression mode at any given time based on network conditions.

Figure 3:
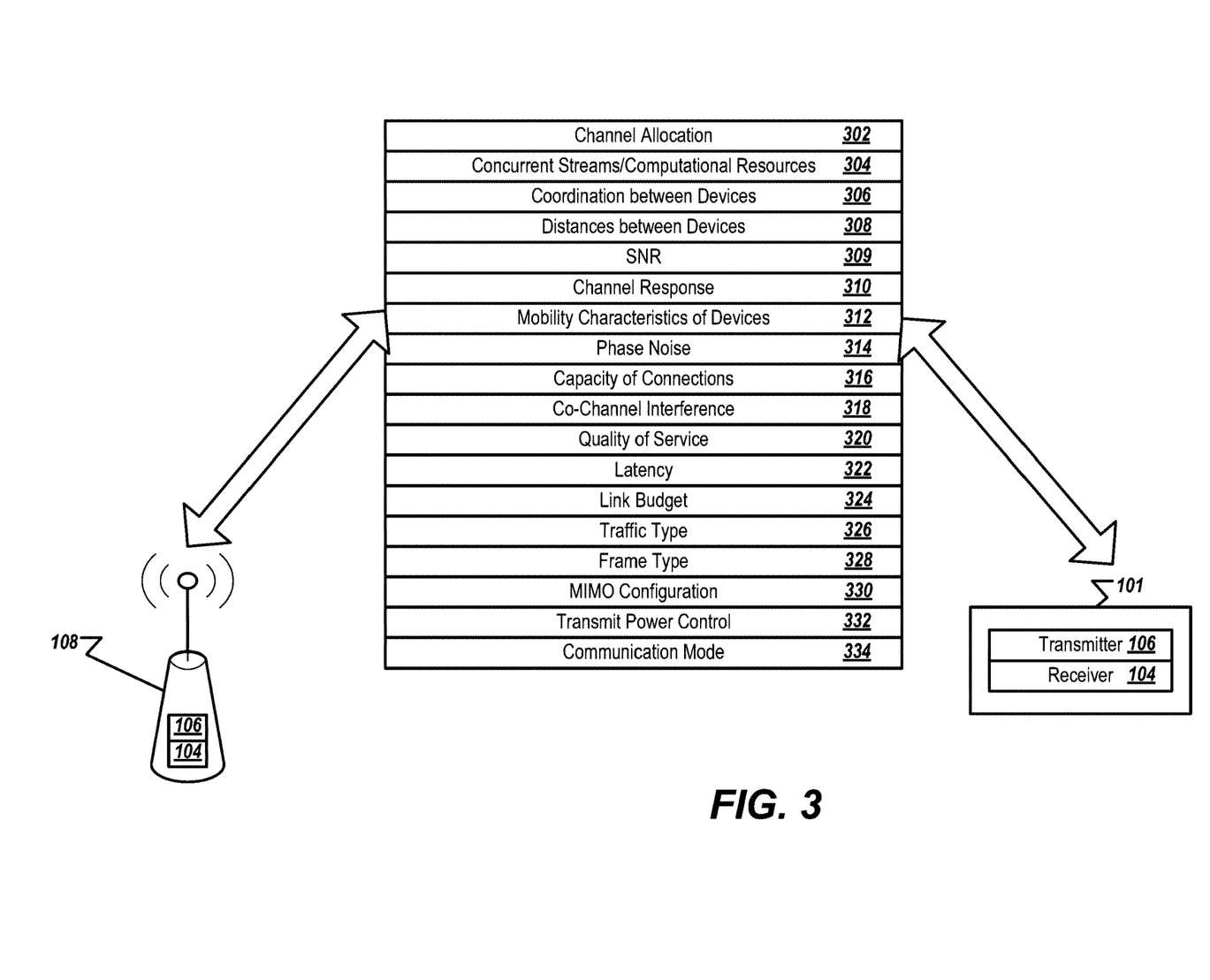
FIG. 3 is an exemplary diagram of factors affecting a determination of whether to implement a high-EVM compression mode or a low-EVM compression mode.

FIG. 3 is an exemplary diagram of factors affecting a determination of whether to implement the high-EVM compression mode or the low-EVM compression mode at step 206 of the multi-mode communication process 200 for communications between the AP 108 and the at least one device 101 and/or between two or more devices. The factors illustrated in FIG. 3 are exemplary and are not meant to be an exhaustive list. The factors can be included as part of the compression mode capability message exchanged between the device 101 and the AP 108 at step 204 of the multi-mode communication process 200 and can include various network configuration properties, properties of a network environment, and other factors that can affect quality of transmitted and received signals.

One factor that goes into determining which compression mode to implement is channel allocation 302. For example, a benefit of some receiver-based nonlinearity mitigation techniques may diminish for channels near the edge of a band for a particular wireless standard (e.g., channels 1 and 13 in an 802.11g/n network using 20 MHz channel width, or channels 36, 64, 100, and 140 in an 802.11ac network using 20 MHz channel width). Accordingly, device(s) responsible for controlling channel selection/allocation may attempt to allocate those channels to devices 101 with receivers 102 that do not include the distortion mitigation circuitry rather than receivers 104 that do include the distortion mitigation circuitry. Similarly, in instances that a connection or transmission has been allocated a channel near the edge of the band, then it may be determined that the low-EVM mode is used for such connections or transmissions.

Another factor that goes into determining whether to implement the high-EVM compression mode of the low-EVM compression mode is balancing concurrent streams and computational resources 304 of the AP 108 and devices 101. In network applications in which a receiver 104 is configured to demodulate multiple data streams (either originated from a single transmitter or from multiple transmitters), the receiver 104 may use different compression modes to process the multiple data streams. For example, a maximum number of concurrent streams that a receiver's distortion mitigating circuitry can support may be determined based on a tradeoff of desired performance and computational resources. Similarly, a number of concurrent streams that a receiver 104 is able to process in the high-EVM compression mode at any given time may be based on a tradeoff between desired performance and power consumption. In this case, the receiver 104 may determine that a subset of the streams are processed in the high-EVM compression mode (i.e. processed by the distortion mitigating circuitry) while the other streams are processed in the low-EVM compression mode (i.e., without aid of the distortion processing circuitry). Any particular received stream processed in high-EVM compression mode at the receiver 104 may or may not have been transmitted by a transmitter 106 operating in the high-EVM compression mode. For example, if a transmitter 106 generating a particular stream is in low-EVM compression mode but is at a far distance from the receiver 104 and/or the stream is experiencing a lot of interference, etc., the receiver 104 may process the stream in the high-EVM compression mode.

Another factor that goes into determining whether to implement the high-EVM compression mode or the low-EVM compression mode is coordination 306 that occurs between the AP 108 and/or the devices 101. In an example where a receiver 104 has sufficient resources for processing one or more high-EVM streams and a particular transmitter 106 supports the high-EVM compression mode, the receiver 104 and transmitter 106 may coordinate (e.g., through management, control or admission messages) the compression modes with one another so that the transmitter 106 sends the stream while operating in high-EVM compression mode and the receiver 104 processes the stream in the high-EVM compression mode, which can result in an increased throughput of that stream.

Determinations made by the transmitters 106 regarding which streams are sent in the high-EVM compression mode or the low-EVM compression mode, and/or determinations made by the receivers 104 as to which streams are processed in which mode may be based on, for example, respective distances 308 between the transmitters 106 of the streams and the receiver 104. For example, for two streams arriving from two transmitters 106 that are positioned at different distances from a receiver 104, the receiver 104 may use the high-EVM compression mode for receiving the stream from the transmitter 106 at a greater distance and the low-EVM compression mode for receiving the stream from the transmitter 106 at the closer distance (assuming the closer transmitter 106 transmitted the stream while operating in the low-EVM compression mode).

For a transmitter 106, transmitting streams to two receivers 104 at different distances, the transmitter 106 may apply the low-EVM compression mode for streams transmitted to the closer receiver 104 due to reduced interference from the low-EVM signal with other signals in the network 100 because of the lower transmit powers that are used to reach the closer receiver 104, thereby improving a total capacity of the network 100. Furthermore, the closer transmitter 106 that supports the high-EVM compression mode may be instructed to use a first MCS and low-EVM compression mode, while the further transmitter 106 is instructed to also use the first MCS but with the high-EVM compression mode. As another example, where one of multiple transmitters 106 is transmitting a stream in the low-EVM compression mode and is too far away from a receiver 104 to successfully receive 104 the stream using low-EVM compression mode, the receiver 104 may use high-EVM compression mode for receiving the stream while other low-EVM streams from other transmitters are processed in low-EVM compression mode at the receiver 103.

As another example, distances/SNR levels from the transmitter 106 may be banded with each band having a particular combination of MCS and EVM mode (e.g., band 1 from distance D1 to D2 is assigned a first MCS and high-EVM compression mode, band 2 from D2 to D3 is assigned the first MCS and low-EVM compression mode, band 3 from D3 to D4 is assigned a second MCS and high-EVM compression mode, etc.). In another example, a close transmitter 106 may require a large throughput (temporarily or in a long-term) and receiver 104 may allow this transmitter 106 to operate in the high-EVM compression mode to enable a higher-order MCS that supports high spectral efficiency for short range-high capacity operations.

Determinations made by the transmitters 106 regarding which streams are sent in the high-EVM compression mode or the low-EVM compression mode, and/or determinations made by the receivers 104 as to which streams are processed in which mode may be based on, for example, signal-to-noise ratio (SNR) 309 of data streams exchanged between the transmitters 106 and the receiver 104. For example, for two streams arriving at the receiver from two transmitters 106 that have varied SNRs, the receiver 104 may use the high-EVM compression mode for receiving the stream from the transmitter 106 that has a higher (better) SNR and the low-EVM compression mode for receiving the stream from the transmitter 106 that has a lower (worse) SNR.

Another factor that goes into determining whether to implement the high-EVM compression mode or the low-EVM compression mode at the transmitters 106 and/or receivers 104 of the AP 108 and/or devices is a channel response 310 for the various channels over which the streams are to be transmitted. For example, for IEEE 802.11ac streams with an equal multi-stream MIMO configuration in the presence of severe frequency fading, a stronger stream may distort a signal of other weaker streams, which can degrade receiver performance. Thus, in implementations where the receiver 104 can process N streams in the high-EVM compression mode, the receiver 104 can use the high-EVM compression mode for processing the M high-EVM streams from transmitters 106 operating in the high-EVM compression mode as well as the N-M low-EVM streams which are being most negatively impacted by the interference. Similarly, a receiver 104 may measure the channel response and use the measured channel response to determine whether to request that a transmitter 106 switch to high-EVM compression mode.

Determinations made by the transmitters 106 regarding which streams are sent in the high-EVM compression mode or the low-EVM compression mode, and/or determinations made by the receivers 104 as to which streams are processed in which mode may be based on, for example, mobility characteristics 312 of the devices 101 involved. For example, a receiver 104 may better tolerate Doppler Effect due to an iterative nature of the distortion mitigating circuitry than a receiver 102 that does not include the distortion mitigating circuitry. Accordingly, when a receiver 104 is determining which low-EVM streams to processes in the high-EVM compression mode, the receiver 104 may prioritize streams from transmitters 106 which are moving fastest, most-often, and/or the like higher than streams from transmitters 106 that are moving more slowly or less often. Similarly, when determining transmit parameters for transmission streams (e.g., MCS, high-EVM or low-EVM compression mode, and/or others), the transmitter 106 may consider whether the transmitter 106 is moving, whether the target receiver is moving, and whether the target receiver is a distortion mitigating receiver 104.

Another factor that goes into determining whether to implement the high-EVM compression mode or the low-EVM compression mode at the transmitters 106 and/or receivers 104 is phase noise level 314. For example, the receivers 104 may provide greater phase noise tolerance than the receivers 102. Accordingly, a receiver 104 can determine whether to process the signal in low-EVM compression mode or high-EVM compression mode based on an estimated amount of phase noise for a particular signal (e.g., based on whether the phase noise is above or below a determined threshold for the MCS in use). Similarly, the receiver 104 can use the phase noise estimation to determine whether to request that the transmitter 106 switch to the high-EVM compression mode.

Capacity of the various connections 316 over which the streams are to be transmitted is another factor that goes into determining whether to implement the high-EVM compression mode or the low-EVM compression mode at the transmitters 106 and/or receivers 104. That is, the benefits of the high-EVM compression mode may increase with a link capacity. Therefore, when deciding between which of two connections to use with the high-EVM compression mode, the link connection with a higher capacity may be given preference.

Co-channel interference 318 present on the various channels to be used for the various streams is another factor that goes into determining whether to implement the high-EVM compression mode or the low-EN/MI compression mode at the transmitters 106 and/or receivers 104. For example, in some instances where amounts of co-channel interference are low, it may be sufficient (e.g., to achieve some desired error rate) to transmit a low-EVM signal and process the signal in the low-EVM compression mode at the receiver 104. In other instances where amounts of co-channel interference are higher, in order to achieve a desired error rate, the transmit power can be increased, and the high-EVM compression mode can be used in both the transmitter 106 and receiver 104 to achieve a predetermined signal-to-interference level at the receiver.

Determinations made by the transmitters 106 regarding which streams are sent in the high-EVM compression mode or the low-EVM compression mode, and/or determinations made by the receivers 104 as to which streams are processed in which mode may be based on, for example, QoS (Quality of Service) 320 (e.g., characterized by latency and/or stream priority) that is desired or required for each of the streams. For example, using the high-EVM compression mode in a receiver 104 may improve link quality and thus higher priority streams may be given a higher priority when determining which streams to process in high-EVM compression mode at the receiver 104.

Latency 322 is another factor that goes into determining whether to implement the high-EVM compression mode or the low-EVM compression mode at the transmitters 106 and/or receivers 104. In some implementations, the high-EVM compression mode in a receiver 104 may introduce higher latency and thus streams that have latency specifications that are less than the latency associated with the high-EVM compression mode may be processed in low-EVM compression mode or a "low-latency high EVM" mode. A "low-latency high EVM mode" may include reducing (relative to a latency-insensitive high EVM mode which may use a greater number of iterations in an attempt to reduce error rates at the expense of increased latency) a limit on a maximum number of iterations that the receiver 104 can perform on a particular symbol. Therefore, the number of iterations performed by a receiver 104 in high-EVM compression mode and/or the maximum EVM of a transmitted signal from a transmitter in high-EVM compression mode may be controlled based on latency specifications of the particular traffic (service). For example, a transmitter 106 operating in the high-EVM compression mode may transmit Voice over IP (VoIP) traffic that has lower latency specifications with a lower EVM than FTP traffic transmissions, and the receiver 104 in high-EVM compression mode may set a lower iterations limit for the VoIP traffic than the FTP traffic.

Determinations made by the transmitters 106 regarding which streams are sent in the high-EVM compression mode or the low-EVM compression mode, and/or determinations made by the receivers 104 as to which streams are processed in which mode may be based on, for example, respective link budgets 324 for the links to the various transmitters 106. In some implementations, the link budget corresponds to a throughput or data rate of the streams. When a link budget exceeds a link budget threshold, one or both of a transmitter 106 and receiver 104 of the link may switch from high-EVM compression mode to low-EVM compression mode (or visa-versa) for communications on the link.

Determinations made by the transmitters 106 regarding which streams are sent in the high-EVM compression mode or the low-EVM compression mode, and/or determinations made by the receivers 104 as to which streams are processed in which mode may be based on, for example, traffic type 326 (data, video, etc.). The determinations of which compression mode to apply can be made based on various other system options (e.g., HARQ—Hybrid Automatic Repeat Request, level of power reduction in TPC—Transmit Power Control) of the various connections. The determinations of which compression mode to apply can also be made based on frame type 328 (e.g., whether a data frame, management frame, control frame, beacon, etc.). For example, if there are any single compression mode receivers 102 in a network, then management frames or beacons on the network are transmitted in the low-EVM compression mode so that the receivers 102 can successfully decode them. If at any time there are only dual compression mode receivers 104 in the network 100, then such frames may be transmitted in the high-EVM compression mode.

Determinations made by the transmitters 106 regarding which streams are sent in the high-EVM compression mode or the low-EVM compression mode, and/or determinations made by the receivers 104 as to which streams are processed in which mode may be based on, for example, MIMO (Multiple Input Multiple Output) configuration 330 (e.g., whether beamforming is in use on each of the connections, whether spatial multiplexing is in use on each of the connections, etc.). For example, the benefits of high-EVM compression mode in a transmitter 106 and/or receiver 104 may be reduced when used in conjunction with beamforming and thus, a transmitter 106 and/or receiver 104 may switch from high-EVM compression mode to low-EVM compression mode when beamforming is being used.

Transmit Power Control (TPC) 332 is another factor that goes into determining whether to implement the high-EVM compression mode or the low-EVM compression mode. In addition, once the compression mode determination has been made, the transmitter 106 can determine transmission power based on TPC parameters. In an example implementation, each of one or more devices (transmitters 106 and/or receivers 104) in the network 100 may include memory in which it stores information about power limitations of itself and/or one or more others of the devices (transmitters and/or receivers) of the network 100. Such information about power limitations may include spectral masks (i.e., limits about the power it is permitted to radiate in various frequency bands) set forth by regional, regulatory, and/or standards bodies. Information about power limitations may include TPC (Transmit Power Control) requirements and commands, hardware limitations (e.g., information (part numbers, classifications, and/or the like) about specific integrated circuits populated in the network devices). Each transmitter 106 may determine an actual transmit power to be used for a particular packet, burst of packets, and/or connection based on the power limitation information. For example, this information may be input to an optimization algorithm to select the combination of transmit powers that, for example, maximize (or minimize or achieve some threshold level of) some performance metric, where the performance metric may be measured over the network as a whole and/or over a subset of the connections in the network 100. In some implementations, the compression mode is selected based on the TPC parameters for the transmitter 106.

A determination of which compression mode to use may also depend on a communication mode 334 (unicast, multicast group, broadcast) for a particular packet, burst of packets, or connection. For unicast, if the intended receiver 104 is configured to receive high-EVM transmissions, then the transmitter 106 may use a high-EVM compression mode and send the unicast transmission as a high-EVM transmission. For multicast or broadcast, if all of the intended receivers 104 support demodulation of a high-EVM transmission, then the multicast or broadcast signal may be sent as a high-EVM transmission. If only a portion of the intended receivers support high-EVM transmissions, then the multicast or broadcast signal may be sent as a low-EVM transmission.

Figure 4:
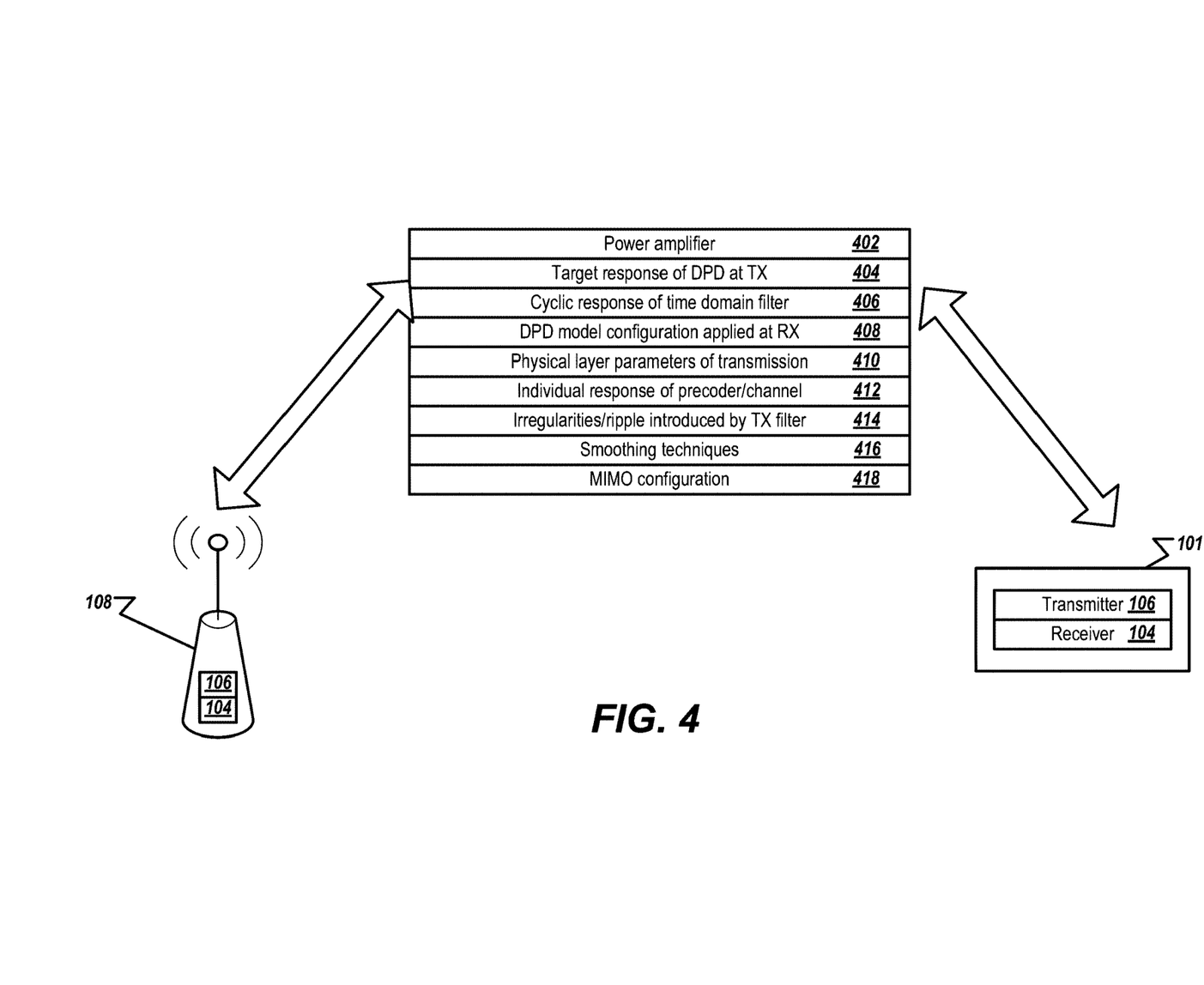
FIG. 4 is an exemplary diagram of configuration parameters for a transmitter or receiver in a high-EVM compression mode.

FIG. 4 is an exemplary diagram of configuration parameters for components of the transmitter 106 and/or receiver 104 as well as properties of the transmitted/received data streams that are configured for the high-EVM compression mode at step 210 of the multi-mode communication process 200 for communications between the AP 108 and the at least one device 101 and/or between two or more devices. For example, the configuration parameters can be included as part of the compression mode parameter message exchanged between the AP 108 and the device 101 at step 208 of the multi-mode communication process 200. The factors illustrated in FIG. 4 are exemplary and are not meant to be an exhaustive list.

A supply voltage of a power amplifier (PA) 402 of the transmitter 106 can be modified when the receiver 104 is operating in the high-EVM compression mode. For example, the transmitter 106 can reduce the supply voltage of the PA so that the PA operates closer to a saturation region of the response to reduce power consumption and improve efficiency. For example, a high-EVM compression mode of a transmitter 106 may correspond to a mode in which the transmit power stays the same as in the low-EVM compression mode, but a supply voltage of the PA is reduced. A receiver 104 may be configured to successfully decode the signal regardless of whether the nonlinearity resulted from increased transmit power, reduced PA supply voltage, or some combination of the two.

In addition, a target response of DPD 404 performed by the transmitter 106 may be modified to improve performance of the high-EVM compression mode. Typically, the DPD target response (e.g., a composite response of the DPD and the PA) is an ideal clip (e.g., a piece-wise linear response with positive slope up to saturation level and then 0 slope at and above the saturation level). The ideal clip response may provide minimal distortion, which can be implemented in the low-EVM compression mode. However, the ideal clip response may make compliance with an applicable spectral mask more difficult. Because a receiver 104 can tolerate a high EVM, the DPD response may be modified to improve spectral mask margins at the expense of increasing EVM (possibly beyond a limit allowed by the applicable standard). A DPD response for a maximum transmission power that complies with the standard spectral mask can be configured into the DPD circuitry of the transmitter 106. The DPD response may, for example, be determined by a Look-Up Table (LUT) stored in memory of the transmitter 106 that can be modified via a software/firmware upgrade in order to support high-EVM communications with a receiver 104. For example, when the transmitter 106 determines or is instructed to transmit in a high-EVM compression mode, the LUT is accessed and the DPD configured into a first DPD response configuration. When the transmitter 106 determines or is instructed to transmit in a low-EVM compression mode, the LUT may again be accessed and the DPD configured into a second DPD response configuration.

In some implementations, a cyclic response of a time domain filter 406 in the transmitter 106 can be used to configure the transmitter 106 and/or the receiver 104 operating in the high-EVM compression mode. In some applications the time domain filter (typically a digital FIR) is implemented at the transmitter 106 to reject an out-of-band response generated by the concatenation of the OFDM symbols. A cyclic response of the (known) filter, which may incur ripple, can be used to improve decoding performance of receiver 104 in the high-EVM compression mode. In implementations where the transmitter 106 supports a precoding (spatial mapping) feature, the transmitter 106 can configure the precoder based on the cyclic response of the time domain filter. This operation can be accomplished by a software/firmware modification to transmitter 106 that is part of the software/firmware modifications for the high-EVM compression mode. In cases where the transmitter 106 operates the precoder for other purposes (e.g., MIMO precoding, beamforming, STBC, CSD), the transmitter 106 can account for the time domain filter response on top of the other precoding.

Alternatively, or in cases where the transmitter 106 is not configured with a precoder capable of being configured based on the cyclic response of the time domain filter, the receiver 104 can be used to compensate for the cyclic response of transmitter 106. For example, the receiver 104 can have a predefined bank of stored cyclic responses. Following activation of the high-EVM compression mode with a particular device 101, the receiver 104 can select the appropriate response from the bank (which may be implemented by a Flash, ROM, LUT, etc.) and use the stored cyclic response to improve decoding. The selected response may be identical to the filter response of transmitter 106 or one which most closely resembles (e.g., based on a least square metric) the response. In addition, the transmitter 106 can send the cyclic response to the receiver 104 as part of, or following activation of the high-EVM compression mode.

Power backoff 408 is another parameter that is used to configure the transmitter 106 and/or receiver 104 operating in the high-EVM compression mode. In some implementations, TPC is used to reduce interference, reduce power consumption, protect nearby receivers from being overloaded, etc. In cases where TPC is used, a nonlinearity-mitigating receiver 104 may have knowledge of an amount of power backoff applied by the transmitter 106 based on the control information communicated to the receiver 104 by the transmitter 106 or by estimating the amount of power backoff by processing a stream received from the transmitter 106. Alternatively, the receiver 104 may send control information to the transmitter 106 with a desired amount of backoff for the transmitter to use. The receiver 104 can determine the amount of desired backoff based on, for example, various performance indicators that can include BER, BLEB, PER, RSS, and/or MSE of the received signal; type and/or level of interference present on the channel over which the receiver 104 receives transmissions from the transmitter 106; channel conditions (mobility, multipath, etc.); and/or the like. In an example implementation, the desired amount of backoff is transmitted over a header symbol (e.g., as an extension to the MCS), or by other fields of a frame.

As previously discussed, when the transmitter 106 uses DPD, a nonlinearity of the transmitter 106 may be known and the receiver 104 may set parameters of the DPD model configuration 408 to predetermined values based on the nonlinearity of the transmitter 106. In an example where the transmitter 106 is operating in the high-EVM compression mode and is not configured to perform DPD, is not performing DPD, or the DPD performance is poor, the receiver 104 may adaptively configure parameter values of the DPD model of the nonlinearity of the transmitter 106. For example, the receiver 104 may use standard preamble sections (e.g., the long training field (LTF) of IEEE 802.11 standards) and/or headers to adaptively configure the parameter values of the DPD model. Additionally, or alternatively, the receiver 104 can request that the transmitter 106 send one or more additional training symbols (e.g., an additional long training field (LTF)) in a preamble of a signal transmission. The receiver 104 extracts the additional training symbols from a preamble or header of a signal received from the device 101 and uses the additional training symbols to improve an accuracy of the DPD model of the nonlinearity of the transmitter 106. In some implementations, the receiver 104 can determine that a transmission is a high-EVM transmission based on a presence of an additional training field in the transmission from the device.

In an example implementation, a transmitter 106 (e.g., circuitry of the transmitter 106 implementing a Media Access Control layer) may select physical layer parameters 410 such as MCS, symbol rate, beamforming on/off, and/or the like based on whether a transmission is to be a high-EVM transmission or low-EVM transmission. The selection of the physical layer parameters by the transmitter 106 may be instead of, or in addition to, selecting the physical layer parameters based on conventional approaches (i.e., the way MAC operates without the high-EVM compression mode) that may use channel conditions, distance to receiver, receiver capabilities (e.g., MIMO order), services required by the receiver, etc. In some implementations, benefits of the high-EVM compression mode may decrease when using beamforming, therefore, for high-EVM transmissions, the transmitter 106 may decide to use multiple data streams without beamforming (spatial multiplexing MIMO configuration) instead of a single or multiple data stream(s) with beamforming. As another example, when operating in the high-EVM compression mode, the transmitter 106 may select higher order MCS to take advantage of increased transmit power and system gain provided by the high-EVM compression mode.

The transmitters 106 and receivers 104 may be configured to perform a rate adaptation algorithm and protocol to determine the MCS and/or compression mode for a transmission. This process attempts to adapt the transmitted signal to the communication quality of the received signal. For example, when a receiver 104 fails to recover the transmitted data (e.g., by using the CRC indication), the receiver 104 may send a NAK (negative acknowledgement) or not send an ACK (acknowledgement). Based on this, a transmitter 106 may decide to use an MCS with a lower spectral efficiency that may be reliably detected at the receiver 102 or 104. Where the transmitter 106 is communicating with a distortion mitigating receiver 104, the rate adaptation algorithm may be adjusted in order to better handle compression by varying both MCS and compression level based on the capabilities of the receiver 104, the reported errors from the receiver 104, and the quality of the channel. When a distortion mitigating receiver 104 fails to extract the data from a compressed signal, the transmitter 106 may either switch to a different MCS or use a less compressed signal for the existing MCS, or changing both concurrently.

Due to the enhanced capabilities of the receiver 104, and an ability to tolerate higher transmitted power for a given MCS than can be tolerated by a receiver 102, a MCS switching table (a data structure which stores thresholds that control when the transmitter 106 and receiver 102 or 104 switches to a different MCS) of a receiver 102 may differ from the MCS switching table of a receiver 104. For example, due to increased transmit power for high-EVM transmissions, a receiver 104 operating in a high-EVM compression mode may use a particular MCS over a longer range of channel attenuation (e.g., SNR level) than the range of channel attenuation for which a receiver 102 can use the same MCS.

In some implementations, one or more signal processing parameters and techniques applied the receiver 104 as well as properties of the transmitted data streams from the device 101 can be configured for the high-EVM compression mode based on one or more identity-based parameters of the transmitter 106. The identity-based parameters are based on the identity of the transmitter 106 and can include an individual response of the precoder/channel 412, ripple/signal irregularities 414 introduced by a time domain filter of the transmitter 106, and smoothing techniques 416 that can be applied to received signals based on the precoder response. In some examples where the receiver 104 does not know the identity of the transmitter 106, the receiver 104 can attempt to force or request that the transmitter modify the identity-based parameters to correspond to known values or parameters.

Identification of the transmitter 106 by the receiver 104 may be carried out by additional header symbols or by modifying existing header symbols. The latter option maintains communication efficiency as well as compatibility with existing standards. For example, reserved bits of the header can be used to carry the identity of transmitter 106. If additional bits are needed for the identification, existing fields of the standard header symbols can be used and converted to carry the identification bits. A revised header format can be part of the high-EVM compression mode and can be selected when the high-EVM compression mode is enabled. Both sides (transmitter 106 and receiver 104) can use the same header structure. Existing header fields which may be converted for use as identification bits include fields that are related to operation modes that are not supported, not related, or less important for the high-EVM mode. Additionally, unsubscribed (unused) subcarriers can be used to carry the identification bits. For example, for Wi-Fi IEEE 802.11ac, four unused subcarriers of SIG-A (52 vs. 48), a padding field, and/or reserved bits of SIG-B may be used for identification bits.

For example, in linear systems (e.g., low-EVM compression mode), only a total response of the precoder and channel is detectable by the receiver 102 or 104. In some situations such as when beamforming is used, a reconstruction of a high-EVM transmission is performed by the receiver 104 in order to provide reliable demodulation/decoding of a high-EVM. To accomplish the reconstruction of the transmission, the receiver 104 may use an individual response of the precoder used for the transmission as well as a response of the channel over which the transmission is being received 412. Accordingly, the receiver 104 can be configured to use knowledge of a transmitter's identity (e.g., a unique identifier associated with the transmitter) to estimate the response of the precoder of the transmitter. This may, for example, involve using a LUT that attaches identifiers to the actual precoder response or information that is used to determine the response of the precoder. To overcome limitations of the high-EVM transmission under particular configurations such as beamforming, the receiver 104 may use knowledge of the identity of the transmitter 106 to estimate and/or to force a response of a precoder of the transmitter 106. Additionally, or alternatively, the receiver 104 may be configured to force (e.g., through a message sent over a control channel, during handshaking, and/or the like) the transmitter 106 to use a particular precoder response. The ability to identify the particular transmitter may enable the receiver 104 to know (e.g., via LUT) which possible precoder responses the transmitter supports and can use.

As previously discussed, the transmitter 106 may use a time domain filter or any other analog filter (e.g., anti-aliasing filter for the digital-to-analog converter). Such a response may cause ripple or other signal irregularities 414 that can degrade the performance of a receiver 104 attempting to demodulate/decode a high-EVM transmission from the transmitter 106. Knowing the identity of transmitter 106 allows the receiver 104 to configure a signal reconstruction path with the known precoder response and/or ripple introduced by the transmitter to compensate for the aforementioned ripple of transmitter 106. This can include, for example, configuring time domain and/or frequency/cyclic domain filter coefficients (e.g., setting a complex gain per subcarrier). The ripple may be compensated in a similar way that is used to compensate for the known transmitter precoder response (i.e., compensate for the ripple in addition to compensating for the precoder response). An identifier/characterization of the ripple may be provided by transmitter 106 upon a request from receiver 104 upon initial connection establishment, at the initialization of high-EVM mode, during operation in the high-EVM mode (e.g., in a header, via a control channel, and/or the like), and/or the like. The receiver 104 may also attempt to estimate the ripple or other signal irregularities (of the linear response of transmitter 106) and then update the appropriate overall precoder (used by the receiver 104) that compensates for the ripple. The resulting updated precoder may be stored in a database (implemented by RAM, LUT, Flash, etc.) and used by receiver 104 when the associated transmitter 106 is identified by the receiver.

The receiver 102 and receiver 104 may each use smoothing techniques 416 to improve channel estimation accuracy (the channel estimation accuracy is limited by AWGN and smoothing over the frequency domain can be used to improve channel estimation accuracy). However, when a precoder is being used (e.g., beamforming) it can be difficult or inefficient to smooth the channel estimation because an effective precoder is highly frequency dependent and introduces a non-flat response. Consequently, smoothing is limited and channel estimation can be noisy (smoothing a channel in the presence of precoder may result in biased and erroneous channel estimation). Knowing the precoder response that is being used by the transmitter allows the receivers 102 and 104 to use efficient smoothing. Knowing the identity of transmitter 106 and the ability to force transmitter 106 to use a particular precoder response allows a receiver 102 or 104 to improve channel estimation accuracy by efficient smoothing.

Another configuration parameter for the transmitter 106 and/or receiver 104 is a MIMO configuration 418. For example, the transmitter 106 may use a MIMO configuration in which the transmitter 106 transmits multiple signals over multiple antennas. Each signal may pass through a PA with a unique (nonlinear) response. At the beginning of a reception of a frame, the receiver 104 may estimate (mutually) the linear channel of each stream as well as the nonlinear response of each of the transmitter chains. The estimate can be based on header and preamble symbols. For MIMO transmissions, an iterative scheme may be used in which multiple consecutive iterations of channel estimation and nonlinear response estimation are concatenated. The iterative scheme may include, for example, starting with channel estimation, then estimating the nonlinear response, and then re-estimating the channel using the estimated nonlinear response. This iterative scheme routine may repeat several times until, for example, predefined criteria are satisfied. In one implementation, the predetermined criteria can include a predefined number of iteration or a convergence based metric (e.g., estimation difference between iterations).

In addition, when transmitter 106 configures the transmitter precoder to operate in a space-time block coding (STBC) mode (known also as Alamouti), the receiver 104 may use a MIMO configuration for reliable decoding while the receiver 102 may be agnostic to STBC and may use a single input single output (S ISO) receive configuration. Using a MIMO decoder for received STBC signals allows the receiver 104 to tolerate nonlinear model mismatch between the transmitter chains (e.g., PAs, antennas, and/or the like) of transmitter 106. The nonlinear model mismatch could be originated for example, by PA response mismatch as well as DPD response mismatch, if applicable.

Figure 5:
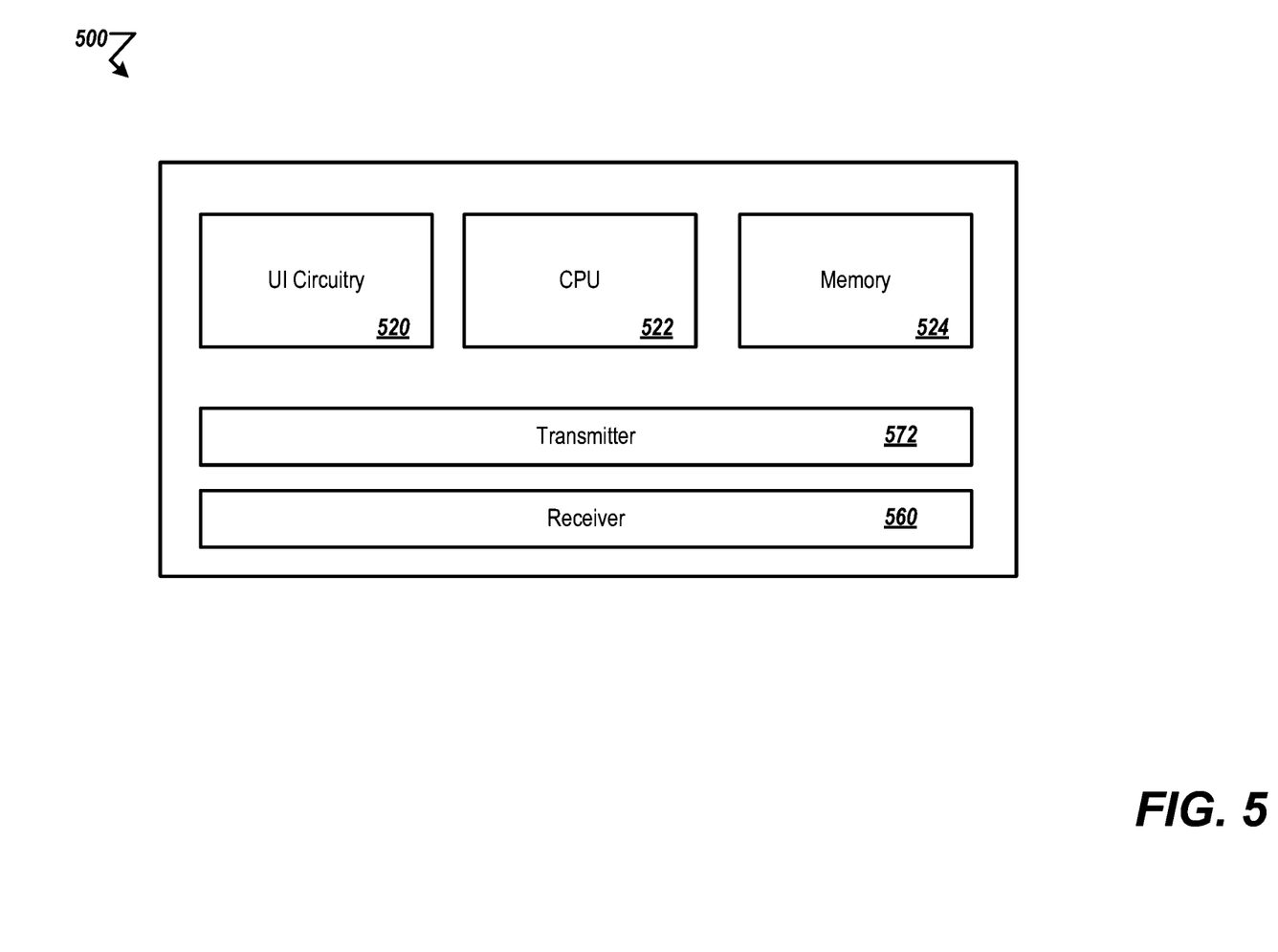
FIG. 5 is an exemplary hardware diagram of a device configured to perform the implementations described herein.

FIG. 5 is an exemplary hardware diagram of a device 500 configured to perforin the implementations described herein. The device 500 can be the AP 108 and/or the device 101 described previously herein. For example, the device 101 can be an user equipment (UE) that is an IEEE 802.11 configurable device such as a smartphone, a tablet computer, a laptop computer, a router, a network switch, a network gateway, or the like. The AP 108 may be, for example, a cellular base station, an 802.11 compatible access point. In some instances, the AP 108 may be the same device as the device 101 but configured into an access point mode.

The device 500 includes user interface (UI) circuitry 520, CPU 522, system memory 524, a receiver 560, and a transmitter 572 and other associated logic, components, and circuitry that are configured to perform the implementations described previously herein. The components of the device 500 shown in FIG. 5 are not exhaustive and can include other components than those described herein. For example, the receiver 560 can be an implementation of the receiver 102 that does not include the distortion mitigation circuitry or the receiver 104 that includes the distortion mitigation circuitry associated with the high-EVM compression mode. Likewise, the transmitter 572 can be an implementation of the transmitter 106 that can be configured to transmit data streams in the high-EVM compression mode and/or the low-EVM compression mode. In addition, the receiver 560 and transmitter 572 can be implemented as a single-chip transceiver. In addition, the CPU 522 includes a processor that executes one or more software processes associated with determining and controlling the compression mode of the transmitter 572 and/or receiver 560 described previously herein. The receiver 560 and transmitter 572 can also include processing circuitry associated with processing received signals in the high-EVM compression mode or low-EVM compression mode and transmitting signals in the high-EVM compression mode or the low-EVM compression mode.

In an example implementation, the transmitter 572 configured to support the high-EVM compression mode may include circuitry which is configurable based on one or more of the following parameters: transmit power backoff per MCS per channel index (to account for band-edge), composite (DPD) response, cyclic response of transmitter's time domain filter, maximum number of concurrently supported high-EVM streams, maximum number of high-EVM transmit paths, supported configurations of MIMO order and channel BW (e.g., 2 streams at 80 MHz, 4 streams at 40 MHz). Values for the parameters may, for example, be stored in hardware and/or software registers of the transmitter (e.g., programmed via a software API and/or "flashing" of firmware). The values may be stored in LUTs and/or other data structures which may be accessed during run-time of the transmitter upon, for example, establishing of a connection, reconfiguring a connection, switching from high-EVM compression mode to low-EVM compression mode, etc.

The receiver 560 configured to operate in the high-EVM compression mode uses various parameters to configure operating modes of the receiver 104. Such parameters may include: maximum number of the high EVM terminals/client, maximum number of supported high EVM streams, maximum number of high EVM transmit paths, supported configurations of MIMO order and channel BW (e.g., 2 streams at 80 MHz, 4 streams at 40 MHz), transmit power backoff (or transmit power) per MCS for the terminal/client per channel index (to account for band-edge), maximum number of iterations per service (to control latency and/or power consumption), network optimization parameters that define how to determine which user to switch to the high-EVM transmission mode, supported nonlinear models, desired composite nonlinear response (the terminal/client DPD response), cyclic response of transmitter's time domain filter, MCS switching table that accommodates power backoff of the counterpart transmitter. Values for the parameters may, for example, be stored in hardware and/or software registers of the receiver (e.g., programmed via a software API and/or "flashing" of firmware). The values may be stored in LUTs and/or other data structures which may be accessed during run-time of the receiver upon, for example, establishing of a connection, reconfiguring a connection, switching from high-EVM compression mode to low-EVM compression mode, etc.

Aspects of the present disclosure enable per-frame identification of a transmitter using existing headers (no additional overhead). Aspects of this disclosure also enable use of transmitter identity to force the transmitter to use a particular precoder response. In addition, the transmitter identity and the known response of the transmitter's precoder can be used to support beamforming over a nonlinear channel. The terminal identity and the known response of the transmitter's precoder can also be used to compensate for the linear response of the transmit chain (from IFFT out to PA input) and to improve channel estimation (smoothing). Aspects of this disclosure also enable use of a full MIMO receiver in STBC mode for receiving transmissions over a nonlinear channel.

The previously described methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may include an application specific integrated circuit or chip. Some implementations may include a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it can be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware.

As used herein, for example, a particular processor and memory may include a first "circuit" when executing a first one or more lines of code and may include a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "configured" to perforin a function whenever the circuitry includes the necessary hardware and code (if any is necessary) to perform the function, regardless of whether performance of the function is disabled or not enabled (e.g., by a user configurable setting, factory trim, etc.).

The invention claimed is:

1. A device capable of operating in a first compression mode and a second compression mode, wherein the first compression mode has a higher error vector magnitude (EVM) than the second compression mode, the device comprising: circuitry configured to
   determine one or more signal processing capabilities of another device in communication with the device, based at least in part on a parameter in a compression mode capability message received from the another device, wherein the parameter indicates a compression mode capability of the another device,
   determine a signal compression mode of the device based at least in part on the compression mode capability of the another device, wherein the signal compression mode is one of the first compression mode or the second compression mode,
   transmit data from the device to the another device using the determined signal compression mode, and
   switch, in response to detecting variations in one or more network configuration properties or the one or more signal processing capabilities of the another device, the signal compression mode of the device to either the first compression mode or the second compression mode.

2. The device of claim 1, wherein
   the first compression mode is associated with a first level amount of signal compression having a first error vector magnitude (EVM) that is greater than a predetermined EVM threshold; and the second compression mode is associated with a second level amount of signal compression having a second EVM that is less than or equal to the predetermined EVM threshold.

3. The device of claim 2, wherein the predetermined EVM threshold corresponds to an EVM threshold of a wireless communication standard.

4. The device of claim 2, wherein the circuitry further includes distortion mitigation circuitry configured to process a received signal from the another device compressed at the first level amount of signal compression associated with the first signal compression mode.

5. The device of claim 4, wherein the circuitry is further configured to modify a signal processing path to bypass the distortion mitigation circuitry in a case that the received signal is compressed at the second level amount of signal compression associated with the second signal compression mode.

6. The device of claim 2, wherein the circuitry is further configured to compress a transmitted signal to the another device with the first level amount of signal compression or the second level amount of signal compression.

7. The device of claim 1, wherein the circuitry is further configured to communicate with the another device via a wireless communication network having a signal compression mode communications protocol.

8. The device of claim 1, wherein the circuitry is further configured to receive the compression mode capability message as a predetermined information element of a message associated with a wireless communication standard.

9. The device of claim 1, wherein the circuitry is further configured to transmit a transmission compression mode capability message to the another device indicating one or more transmitter capabilities of the device.

10. The device of claim 9, wherein the circuitry is further configured to transmit the transmission compression mode capability message to the another device as a predetermined information element of a message associated with a wireless communication standard.

11. The device of claim 1, wherein the circuitry is further configured to transmit a reception compression mode capability message to the another device indicating one or more receiver capabilities of the device as a predetermined information element of a message associated with a wireless communication standard.

12. The device of claim 7, wherein the signal compression mode communications protocol includes a compression mode parameter message indicating operational parameters of the device or the another device configured for one of the first or the second compression modes.

13. The device of claim 12, wherein the circuitry is further configured to transmit the compression mode parameter message to the another device in response to receiving a received compression mode capability message from the another device.

14. The device of claim 13, wherein the circuitry is further configured to receive the compression mode parameter message from the another device in response to transmitting a transmission compression mode capability message to the another device.

15. The device of claim 1, wherein the circuitry is further configured to transmit an additional training symbol request to the another device in response to determining that processing one or more additional training symbols corresponds to a predetermined amount of performance improvement of the device.

16. The device of claim 1, wherein the circuitry is further configured to configure the signal compression mode of the device for one of the plurality of signal compression modes independent of another signal compression mode of the another device.

17. A method comprising:
  determining, via circuitry of a first device capable of operating in a first compression mode and a second compression mode, wherein the first compression mode has a higher error vector magnitude (EVM) than the second compression mode, one or more signal processing capabilities of a second device in communication with the first device, based at least in part on a parameter in a message from the second device, wherein the parameter indicates an amount of nonlinear distortion present in signals received from the second device, and the signal processing capabilities comprise compression mode capabilities of the second device:
  determining, at the first device, a signal compression mode based at least in part on the one or more signal processing capabilities of the second device, wherein the signal compression mode is one of the first compression mode or the second compression mode:
  transmitting data from the first device to the second device using the determined signal compression mode: and
  switching, in response to detecting variations in one or more network configuration properties or the one or more signal processing capabilities of the second device, the signal compression mode of the first device to either the first compression mode or the second compression mode.

18. A system comprising: a device comprising a transceiver and capable of operating in a first compression mode and a second compression mode, wherein the first compression mode has a higher error vector magnitude (EVM) than the second compression mode, with circuitry configured to
  determine a signal processing capability of another device in communication with the device via a wireless communication network, based at least in part on a parameter in a message from the another device, wherein the parameter indicates an amount of nonlinear distortion present in signals received from the another device, and the signal processing capability comprises compression mode capabilities of the another device,
  determine a signal compression mode of the transceiver to process one or more signals received from the another device having the nonlinear distortion, based at least in part on the signal processing capabilities of the another device, wherein the signal compression mode is one of the first compression mode or the second compression mode, and switch, in response to detecting a reduction in the amount of non-linear distortion, the signal compression mode of the device to either the first compression mode or the second compression mode.

\* \* \* \* \*